United States Patent Office 2,774,766
Patented Dec. 18, 1956

2,774,766

BASIC ETHERS

Moses Wolf Goldberg, Upper Montclair, and Sidney Teitel, Nutley, N. J., assignors to Hoffmann-La Roche Inc., Nutley, N. J., a corporation of New Jersey No Drawing. Application September 8, 1954, Serial No. 454,826

6 Claims. (Cl. 260—294.7)

This invention relates to derivatives of 1 - methyl - 3- (2,6,6 - trimethyl - 1 - cyclohexen - 1 - yl)propylamine and 2 - methyl - 4 - (2,6,6 - trimethyl - 1 - cyclohexen - 1 - yl)butylamine. More particularly, this invention relates to tertiary aminoalkoxybenzyl derivatives of 1 - methyl- 3 - (2,6,6 - trimethyl - 1 - cyclohexen - 1 - yl)propylamine and 2 - methyl - 4 - (2,6,6 - trimethyl - 1 - cyclohexen - 1 - yl)butylamine, as well as salts of those compounds.

The compounds of this invention may be represented by the following general formula

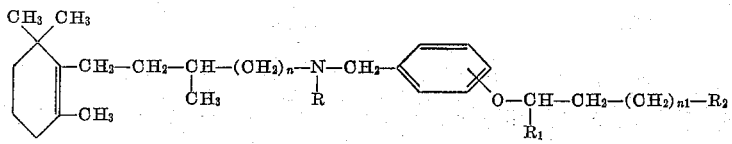

wherein

R and $R_1$ represent hydrogen or lower alkyl,
$R_2$ is a tertiary amino group, and
$n$ and $n_1$ represent 0 or 1.

The tertiary amino groups represented by $R_2$ include, for example, diloweralkylamino and saturated basic, monocylic 5- or 6-membered heterocyclic radicals such as piperidino, morpholino, pyrrolidino, etc. Two preferred classes of compounds constitute those compounds wherein the basic ether group in the above general formula is a diloweralkylaminoalkoxy group or a piperidinoalkoxy group attached to the benzene ring in the para position.

The novel compounds are useful as therapeutic agents, more particularly as antiprotozoan agents (e. g. against *Trichomonas vaginalis*) or antifungal agents (e. g. against *Trichophyton mentagrophytes* and *Microporon lanosum*).

The basic ethers of this invention are prepared by the reductive condensation of 1 - methyl - 3 - (2,6,6 - trimethyl - 1 - cyclohexen - 1 - yl)propylamine or 2 - methyl- 4 - (2,6,6 - trimethyl - 1 - cyclohexen - 1 - yl)butylamine with the appropriate tertiary aminoalkoxy benzaldehyde, e. g. a dialkylaminoalkoxy benzaldehyde, such as 2 - (diethylaminoethoxy)benzaldehyde, or a basic hetero-alkoxy benzaldehyde, such as 4 - [3 - (4 - morpholinyl)propoxy] benzaldehyde. The N-alkyl derivatives of the diamines thus obtained can be prepared by alkylation with a formaldehyde-formic acid mixture or by reduction of the corresponding N-acyl compounds with lithium aluminum hydride. The N-acyl derivatives of the diamines are obtained by reacting the diamine with an acid anhydride or an acyl halide. Tertiary aminoalkoxy benzaldehydes which are used as intermediates for compounds of this invention are produced by reacting the sodium salt of a hydroxy benzaldehyde with a dialkylaminoalkyl halide, a piperidinoalkyl halide or a morpholinoalkyl halide, etc. in a solvent such as chlorobenzene.

The compounds of this invention form salts, such as acid addition salts and quaternary salts. Acid addition salts are prepared by reacting the base with an acid, such as the mineral acids, strong organic acids, such as oxalic acid, etc. The acid addition salts may be converted to the free base by neutralization with an alkaline compound such as sodium hydroxide. Quaternary salts are produced by reacting the base with a quaternizing agent such as an alkyl halide, aralkyl halide, etc. Quternary and acid addition salts containing either one or two anions are within the scope of this invention.

Example 1

15 grams (0.068 mol) of 4 - (2 - diethylaminoethoxy) benzaldehyde and 14.5 grams (0.074 mol) of 1 - methyl- 3 - (2,6,6 - trimethyl - 1 - cyclohexen - 1 - yl)propylamine were dissolved in 100 ml. of ethanol and hydrogenated in the presence of Raney nickel catalyst at 100° C. and 1500 p. s. i. The catalyst was filtered off and the ethanol was distilled off. The residual oil was fractionally distilled. An oily fraction boiling at 180–190° C. (0.08 mm.) was obtained and comprised N - [1 - methyl - 3- (2,6,6 - trimethyl - 1 - cyclohexen - 1 - yl)propyl] - 4- (2 - diethylaminoethoxy)benzylamine.

The oil obtained above was dissolved in ethanol, hydrogen chloride gas was bubbled in to congo red acidity and the solution was evaporated to dryness. The amorphous residue was crystallized from ethanol-acetone-ether, giving the dihydrochloride of N - [1 - methyl - 3 - (2,6,6 - trimethyl - 1 - cylcohexen - 1 - yl)propyl] - 4 - (2 - diethylaminoethoxy)benzylamine, M. P. 69–71° C.

Example 2

20 grams (0.05 mol) of N - [1 - methyl - 3 - (2,6,6 - trimethyl - 1 - cyclohexen - 1 - yl)propyl] - 4 - (2 - diethylaminoethoxy)benzylamine, prepared according to Example 1, and 3.9 grams (0.05 mol) of acetyl chloride were dissolved in 200 ml. of dry benzene. The solution was refluxed for 5 hours and then cooled. The crystals that formed were filtered off, washed with benzene and dried. The hydrochloride of N - acetyl - N - [1 - methyl - 3- (2,6,6 - trimethyl - 1 - cyclohexen - 1 - yl)propyl] - 4 - (2 - diethylaminoethoxy)benzylamine, M. P. 132–134° C., was recrystallized from acetonitrile-ether.

Example 3

To 122 grams (1 mol) of p-hydroxybenzaldehyde in 1 liter of chlorobenzene was added 66 grams (1.04 mol) of sodium methoxide (85%) and 108 grams (1 mol) of 2 - dimethylaminoethyl chloride. The mixture was stirred and refluxed for 15 hours, then cooled and the insolubles were filtered off. The volatiles were distilled off at steam temperature under water vacuum, and the residual oil was fractionated in vacuo to give 4 - (2 - dimethylaminoethoxy)benzaldehyde, $b_{2.2}$ 145° C., $n_D^{25}=1.5471$.

One teaspoon of Raney nickel catalyst was added to a solution of 39 grams (0.2 mol) of 1 - methyl - 3 - (2,6,6- trimethyl - 1 - cyclohexen - 1 - yl)propylamine and 38 grams (0.2 mol) of 4 - (2 - dimethylaminoethoxy)benzaldehyde in 300 ml. of ethanol. The mixture was hydrogenated at 100° C. and 1500 p. s. i. The catalyst was filtered off and the ethanol was distilled off. The residual oil was fractionated in vacuo to obtain N - [1 - methyl- 3 - (2,6,6 - trimethyl - 1 - cyclohexen - 1 - yl)propyl]- 4 - (2 - dimethylaminoethoxy)benzylamine, $b_{0.2}$ 196° C., $n_D^{26}=1.5168$.

An aliquot, when treated with alcoholic hydrochloric acid, gave the crystalline dihydrochloride hemihydrate, M. P. 159–161° C. with decomposition (recrystallized from methanol-acetone).

Example 4

To 15 grams (0.04 mol) of N - [1 - methyl - 3 - (2,6,6 - trimethyl - 1 - cyclohexen - 1 - yl)propyl] - 4 - (2 - dimethylaminoethoxy)benzylamine (obtained as in Example 3) dissolved in 8.05 ml. (0.134 mol) of 90% formic acid was added 4.0 ml. (0.046 mol) of 35% formaldehyde. The solution was stirred on a steam bath for 3 hours and the excess formaldehyde and formic acid were distilled off. The residual oil was made strongly alkaline with 30% sodium hydroxide and extracted with ether. The ether extract was washed with water, dried with potassium carbonate and the ether distilled off. The residual oil was treated with excess oxalic acid dissolved in acetone. The precipitate thus obtained was crystallized from methanol-acetone to obtain N - methyl - N - [1 - methyl - 3 - (2,6,6 - trimethyl - 1 - cyclohexen - 1 -yl)propyl] - 4 - (2 - dimethylaminoethoxy)benzylamine dioxalate, M. P. 190–191° C. with decomposition.

Example 5

61 grams (0.5 mol) of m-hydroxybenzaldehyde and 95 grams (0.7 mol) of 2-diethylaminoethyl chloride were reacted according to the procedure described in the first paragraph of Example 3 to produce 3-(2-diethylaminoethoxy)benzaldehyde, $b_{0.08}$ 110° C., $n_D^{26}=1.5210$.

19.5 grams (0.1 mol) of 1-methyl-3-(2,6,6-trimethyl-1-cyclohexen-1-yl)propylamine and 22.1 grams (0.1 mol) of 3-(2-diethylaminoethoxy)benzaldehyde were reacted according to the procedure described in the second paragraph of Example 3 to obtain N - [1 - methyl - 3 - (2,6,6 - trimethyl - 1 - cyclohexen - 1 - yl)propyl] - 3 - (2 - diethylaminoethoxy)benzylamine, $b_{0.05}$ 180–183° C., $n_D^{25}=1.5149$.

An aliquot, when treated with an acetone solution of oxalic acid, gave the crystalline dioxalate. The melting point was 163–164° C. with slight decomposition after the product was recrystallized from methanol-acetonitrile.

Example 6

20 grams (0.05 mol) of N - [1 - methyl - 3 - (2,6,6 - trimethyl - 1 - cyclohexen - 1 -yl)propyl] - 3 - (2 - diethylaminoethoxy)benzylamine (obtained as in Example 5), 9.5 ml. (0.176 mol) of 90% formic acid and 4.8 ml. (0.055 mol) of 35% formaldehyde were reacted according to the procedure of Example 4 to obtain N - methyl - N - [1 - methyl - 3 - (2,6,6 - trimethyl - 1 - cyclohexen - 1 - yl)propyl] - 3 - (2 - diethylaminoethoxy)benzylamine dioxalate. The product was recrystallized from water-methanol-acetone and melted at 209–210° C. with decomposition.

Example 7

61 grams (0.5 mol) of salicylaldehyde and 95 grams (0.7 mol) of 2-diethylaminoethyl chloride were reacted as described in the first paragraph of Example 3 to produce 2-(2-diethylaminoethoxy)benzaldehyde, $b_{0.09}$ 111° C., $n_D^{26}=1.5248$.

19.5 grams (0.1 mol) of 1-methyl-3-(2,6,6-trimethyl-1-cyclohexen-1-yl)propylamine and 22.1 grams (0.1 mol) of 2-(2-diethylaminoethoxy)benzaldehyde were reacted in the manner described in the second paragraph of Example 3 to obtain N - [1 - methyl - 3 - (2,6,6 - trimethyl - 1 - cyclohexen - 1 - yl)propyl] - 2 - (2 - diethylaminoethoxy)-benzylamine, $b_{0.03}$ 165° C., $n_D^{25}=1.5138$.

An aliquot of the free base obtained above, when treated with alcoholic hydrochloric acid, gave the crystalline dihydrochloride, M. P. 193–195° C. with slight decomposition (recrystallized from ethanol-ether).

Example 8

20 grams (0.05 mol) of N - [1 - methyl - 3 - (2,6,6 - trimethyl - 1 - cyclohexen - 1 - yl)propyl] - 2 - (2 - diethylaminoethoxy)benzylamine (obtained as in Example 7), 9.5 ml. (0.176 mol) of 90% formic acid and 4.8 ml. (0.055 mol) of 35% formaldehyde were reacted as described in Example 4 to produce N - methyl - N - [1 - methyl - 3 - (2,6,6 - trimethyl - 1 - cyclohexen - 1 - yl)propyl] - 2 - (2 - diethylaminoethoxy)benzylamine dioxalate, M. P. 154–156° C. (recrystallized from ethanol-ether).

Example 9

20 grams (0.05 mol) of N - [1 - methyl - 3 - (2,6,6 - trimethyl - 1 - cyclohexen - 1 - yl)propyl] - 4 - (2 - diethylaminoethoxy)benzylamine, 9.5 ml. (0.176 mol) of 90% formic acid and 4.8 ml. (0.055 mol) of 35% formaldehyde were reacted according to the procedure described in Example 4 to obtain N - methyl - N - [1 - methyl - 3 - (2,6,6 - trimethyl - 1 - cyclohexen - 1 - yl)propyl] - 4 - (2 - diethylaminoethoxy)benzylamine dioxalate, M. P. 168–169° C. (recrystallized from 95% ethanol-ether).

Example 10

22.2 grams (0.05 mol) of N - acetyl - N - [1 - methyl - 3 - (2,6,6 - trimethyl - 1 - cyclohexen - 1 - yl)propyl] - 4 - (2 - diethylaminoethoxy)benzylamine (obtained from the product of Example 2 by neutralization with sodium carbonate) dissolved in 150 ml. of absolute ether, were slowly added to a stirred suspension of 5 grams (0.13 mol) of lithium aluminum hydride in 300 ml. absolute ether, at a rate to maintain gentle refluxing. The mixture was then stirred and refluxed for 4 hours. The mixture was cooled and ethyl acetate was slowly added to decompose the unreacted lithium aluminum hydride. Dilute aqueous sodium hydroxide was then added to pH10. The ether layer was separated off and the aqueous emulsified layer was extracted twice more with fresh portions of ether. The combined ether extracts were washed with water, dried with sodium sulfate and the ether was distilled off. The residual oil was then treated with oxalic acid in acetone to obtain N - ethyl - N - [1 - methyl - 3 - (2,6,6 - trimethyl - 1 - cyclohexen - 1 -yl)propyl] - 4 - (2 - diethylaminoethoxy)benzylamine dioxalate hemihydrate. Upon recrystallization from methanol-acetone-ether, the product melted at 96–97° C.

Example 11

122 grams (1 mol) of p-hydroxybenzaldehyde and 168 grams (1.4 mol) of 2-dimethylaminoisopropyl chloride were reacted as described in the first paragraph of Example 3 to obtain 4-(2-dimethylaminoisopropoxy)benzaldehyde, $b_2$ 143° C., $n_D^{26}=1.5408$.

39 grams (0.2 mol) of 1-methyl-3-(2,6,6-trimethyl-1-cyclohexen-1-yl)propylamine and 39.3 grams (0.19 mol) of 4-(2-dimethylaminoisopropoxy)benzaldehyde were reacted according to the procedure described in the second paragraph of Example 3 to obtain N - [1 - methyl - 3 - (2,6,6 - trimethyl - 1 - cyclohexen - 1 - yl)propyl] - 4 - (2 - dimethylaminoisopropoxy)benzylamine, $b_{0.2}$ 200–202° C., $n_D^{28}=1.5139$.

An aliquot, when treated with an acetone solution of oxalic acid, gave the crystalline dioxalate, M. P. 190–191° C. with decomposition (recrystallized from methanol-acetone).

Example 12

15.5 grams (0.04 mol) of N - [1 - methyl - 3 - (2,6,6 - trimethyl - 1 - cyclohexen - 1 - yl)propyl] - 4 - (2 - dimethylaminoisopropoxy)benzylamine (obtained as described in the preceding example), 8.1 ml. (0.134 mol) of 90% formic acid and 4.0 ml. (0.045 mol) of 35% formaldehyde were reacted as described in Example 4 to produce N - methyl - N - [1 - methyl - 3 - (2,6,6 - trimethyl - 1 - cyclohexen - 1 - yl)propyl] - 4 - (2 - dimethylaminoisopropoxy)benzylamine dioxalate. The product was recrystallized from methanol-acetone-ether and melted at 137–138° C.

Example 13

37 grams (0.19 mol) of 1-methyl-3-(2,6,6-trimethyl-1-cyclohexen-1-yl)propylamine and 43 grams (0.183 mol) of 4-(3-diethylaminopropoxy)benzaldehyde were reacted according to the procedure described in the second paragraph of Example 3 to obtain N-[1-methyl-3-(2,6,6-trimethyl - 1 - cyclohexen - 1 - yl)propyl] - 4 - (3 - diethylaminopropoxy)benzylamine, b$_{0.01}$ 195° C., $n_D^{26}$=1.5131.

An aliquot of the product obtained above, when treated with alcoholic hydrochloric acid, gave the crystalline dihydrochloride. The dihydrochloride was recrystallized from acetonitrile-ether and melted at 164–165° C.

*Example 14*

20.7 grams (0.05 mol) of N-[1-methyl-3-(2,6,6-trimethyl - 1 - cyclohexen - 1 - yl) - propyl] - 4 - (3 - diethylaminopropoxy)benzylamine (obtained as described in the preceding example), 9.5 ml. (0.176 mol) of 90% formic acid and 4.8 ml. (0.055 mol) of 35% formaldehyde were reacted according to the procedure of Example 4 to produce N-methyl-N-[1-methyl-3-(2,6,6-trimethyl - 1 - cyclohexen-1-yl)propyl] - 4 - (3 - diethylaminopropoxy)benzylamine dioxalate. The product was recrystallized from methanol-acetone and melted at 177–178° C. with decomposition.

*Example 15*

67 grams (0.55 mol) of p-hydroxybenzaldehyde and 88 grams (0.55 mol) of 3-piperidinopropyl chloride were reacted as described in the first paragraph of Example 3 to obtain 4-[3-(1-piperidyl)propoxy]benzaldehyde, b$_1$ 157° C., $n_D^{27}$=1.5483.

19.5 grams (0.1 mol) of 1-methyl-3-(2,6,6-trimethyl-1-cyclohexen-1-yl)-propylamine and 24.7 grams (0.1 mol) of 4-[3-(1-piperidyl)propoxy]benzaldehyde were reacted in the manner described in the second paragraph of Example 3 to produce N-[1-methyl-3-(2,6,6-trimethyl-1-cyclohexen-1-yl)propyl]-4-[3-(1-piperidyl)propoxy]benzylamine, b$_{0.05}$ 190–200° C., $n_D^{26}$=1.5239.

An aliquot, when treated with an acetone solution of oxalic acid, gave the crystalline dioxalate monohydrate, M. P. 123–125° C. after recrystallization from methanol-acetone.

An aliquot of the base, when treated with alcoholic hydrobromic acid, gave the crystalline dihydrobromide, M. P. 166–168° C. after recrystallization from ethanol-ether.

*Example 16*

12.9 grams (0.03 mol) of N-[1-methyl-3-(2,6,6-trimethyl - 1 - cyclohexen - 1 - yl)propyl] - 4 - [3 - (1 - piperidyl)propoxy]benzylamine (obtained as in Example 15), 6 ml. (0.1 mol) of 90% formic acid and 3 ml. (0.034 mol) of 35% formaldehyde yielded N-methyl-N-[1-methyl-3-(2,6,6-trimethyl-1-cyclohexen-1-yl)propyl]-4-[3-(1-piperidyl)propoxy]benzylamine dioxalate when reacted according to the method described in Example 4. The product was crystallized from ethanol-acetone, M. P. 101–102° C.

*Example 17*

23 grams (0.19 mol) of p-hydroxybenzaldehyde and 31 grams (0.19 mol) of 3-morpholinyl propyl chloride were reacted as described in the first paragraph of Example 3 to obtain 4-[3-(4-morpholinyl)propoxy]benzaldehyde, b$_{0.2}$ 164° C., $n_D^{27}$=1.5548.

10 grams (0.05 mol) of 1-methyl-3-(2,6,6-trimethyl-1-cyclohexen-1-yl)-propylamine and 12.5 grams (0.05 mol) of 4-[3-(4-morpholinyl)propoxy]benzaldehyde were reacted as described in the second paragraph of Example 3 to obtain N-[1-methyl-3-(2,6,6-trimethyl-1-cyclohexen-1-yl)propyl]-4-[3-(4-morpholinyl)propoxy]benzylamine dihydrochloride hemihydrate. Upon recrystallization from acetonitrile-ether, the product melted at 173–175° C.

*Example 18*

Four teaspoons of Raney nickel catalyst were added to a solution of 310 grams (1.5 mol) of 4-(2,6,6-trimethyl-1-cyclohexen-1-yl)-2-methyl-buten(2)-al-(1) and 200 ml. of liquid ammonia in 800 ml. of methanol. The mixture was hydrogenated at 150° C. and 1500 p. s. i. The catalyst was filtered off, the excess ammonia and methanol were distilled off, and the residual oil was fractionated in vacuo to obtain 2-methyl-4-(2,6,6-trimethyl-1-cyclohexen - 1 - yl)-butylamine, b$_{1.3}$ 94° C., $n_D^{28}$=1.4850.

84 grams (0.4 mol) of 2-methyl-4-(2,6,6-trimethyl-1-cyclohexen-1-yl)butylamine and 87 grams (0.4 mol) of 4-(2-diethylaminoethoxy)benzaldehyde were reacted as described in the second paragraph of Example 3 to produce N-[2-methyl-4-(2,6,6-trimethyl-1-cyclohexen-1-yl)-butyl]-4-(2-diethylaminoethoxy)-benzylamine, b$_{0.01}$ 192° C., $n_D^{25}$=1.5149.

An aliquot of the product obtained above, when treated with an acetone solution of oxalic acid, gave the crystalline dioxalate, M. P. 189–190° C. with decomposition (recrystallized from methanol).

*Example 19*

20.7 grams (0.05 mol) of N-[2-methyl-4-(2,6,6-trimethyl - 1 - cyclohexen - 1 - yl)butyl] - 4-(2-diethylaminoethoxy)benzylamine (obtained in the preceding example), 9.5 ml. (0.176 mol) of 90% formic acid and 4.8 ml. (0.055 mol) of 35% formaldehyde were reacted as described in Example 4 to produce N-methyl-N-[2-methyl-4-(2,6,6-trimethyl-1-cyclohexen-1-yl)butyl] - 4 - (2-diethylaminoethoxy)benzylamine dioxalate, M. P. 150–152° C. (recrystallized from methanol-acetone).

*Example 20*

42 grams (0.2 mol) of 2-methyl-4-(2,6,6-trimethyl-1-cyclohexen-1-yl)butylamine and 39.3 grams (0.19 mol) of 4-(2-dimethylaminoisopropoxy)benzaldehyde (obtained as in the first paragraph of Example 11) were reacted as described in the second paragraph of Example 3 to obtain N-[2-methyl-4-(2,6,6-trimethyl-1-cyclohexen-1-yl)-butyl]-4-(2-dimethylaminoisopropoxy)benzylamine, b$_{0.01}$ 195–200° C., $n_D^{25}$=1.5155.

An aliquot, when treated with alcoholic hydrobromic acid, gave the crystalline dihydrobromide. The dihydrobromide was recrystallized from acetonitrile-acetone-ether and melted at 177–179° C. with decomposition.

*Example 21*

76 grams (0.62 mol) of p-hydroxybenzaldehyde and 73 grams (0.6 mol) of 3-dimethylaminopropyl chloride were reacted as described in the first paragraph of Example 3 to produce 4-(3-dimethylaminopropoxy)benzaldehyde, b$_{1.1}$ 143° C., $n_D^{26}$=1.5415.

12.5 grams (0.06 mol) of 2-methyl-4-(2,6,6-trimethyl-1-cyclohexen-1-yl)butylamine and 12.4 grams (0.06 mol) of 4-(3-dimethylaminopropoxy)benzaldehyde were reacted in the manner described in the second paragraph of Example 3 to obtain N-[2-methyl-4-(2,6,6-trimethyl-1-cyclohexen-1-yl)butyl]-4-(3-dimethylaminopropoxy)benzylamine, b$_{1.8}$ 215–217° C., $n_D^{27}$=1.5148.

An aliquot, when treated with an acetone solution of oxalic acid, gave the crystalline dioxalate. The dioxalate was recrystallized from methanol and melted at 209–210° C. with decomposition.

*Example 22*

36.2 grams (0.173 mol) of 2-methyl-4-(2,6,6-trimethyl-1-cyclohexen-1-yl)butylamine and 40.5 grams (0.173 mol) of 4-(3-diethylaminopropoxy)benzaldehyde were reacted according to the procedure in the second paragraph of Example 3 to obtain N-[2-methyl-4-(2,6,6-trimethyl-1-cyclohexen-1-yl)butyl] - 4 - (3-diethylaminopropoxy)benzylamine, b$_{0.05}$ 205–208° C., $n_D^{27}$=1.5125.

An aliquot, when treated with an acetone solution of oxalic acid, gave the crystalline dioxalate. Upon recrystallization from methanol-ethanol, the dioxalate melted at 199–200° C. with decomposition.

*Example 23*

10.5 grams (0.024 mol) of N-[2-methyl-4-(2,6,6-trimethyl-1-cyclohexen - 1 - yl)butyl]-4-(3-diethylaminopropoxy)benzylamine (obtained in the preceding example), 4.8 ml. (0.08 mol) of 90% formic acid and 2.4 ml. of 35% formaldehyde were reacted as described in Example 4 to obtain N-methyl-N-[2-methyl-4-(2,6,6-trimethyl-1-cyclohexen-1-yl)butyl]-4-(3-diethylaminopropoxy)benzylamine dioxalate. The dioxalate had a melting point of 144–146° C. upon recrystallization from ethanol-acetone.

*Example 24*

21 grams (0.1 mol) of 2-methyl-4-(2,6,6-trimethyl-1-cyclohexen-1-yl)butylamine and 24.7 grams (0.1 mol) of 4-[3-(1-piperidyl)propoxy]benzaldehyde (obtained as in Example 15) were reacted as described in the second paragraph of Example 3 to produce N-[2-methyl-4-(2,6,6-trimethyl-1-cyclohexen-1-yl)butyl]-4-[3-(1-piperidyl)propoxy]benzylamine, b$_{0.02}$ 210–215° C., $n_D^{26}$=1.5232.

An aliquot, when treated with an acetone solution of oxalic acid, gave the crystalline dioxalate which had a melting point of 189–191° C. with decomposition (recrystallized from methanol-ethanol).

*Example 25*

13.2 grams (0.03 mol) of N-[2-methyl-4-(2,6,6-trimethyl-1-cyclohexen-1-yl)butyl]-4-[3-(1-piperidyl)propoxy]benzylamine (obtained in the preceding example), 6 ml. (0.1 mol) of 90% formic acid and 3 ml. (0.034 mol) of 35% formaldehyde were reacted in the manner described in Example 4 to produce N-methyl-N-[2-methyl-4-(2,6,6-trimethyl-1-cyclohexen - 1 - yl)butyl]-4-[3-(1-piperidyl)propoxy]benzylamine dioxalate sesquihydrate. The product was recrystallized from methanol-acetone and melted at 149–151° C.

*Example 26*

19.5 grams (0.1 mol) of 1-methyl-3-(2,6,6-trimethyl-1-cyclohexen-1-yl)propylamine and 20.8 grams (0.1 mol) of 4-(3-dimethylaminopropoxy)benzaldehyde (prepared as in Example 21) were reacted according to the procedure described in the second paragraph of Example 3 to produce N-[1-methyl-3-(2,6,6 - trimethyl-1-cyclohexen-1-yl)propyl] - 4 - (3 - dimethylaminopropoxy)benzylamine, b$_{0.08}$ 180° C., $n_D^{25}$=1.5138.

An aliquot, when treated with an acetone solution of oxalic acid, gave the crystalline dioxalate, M. P. 140–142° C. (crystallized from methanolacetone).

*Example 27*

To 33.5 grams (0.23 mol) of salicylaldehyde in 400 ml. of chlorobenzene were added 18 grams (0.28 mol) of sodium methoxide (85%) and 44 grams (0.23 mol) of 3-piperidylpropyl chloride. The mixture was stirred and refluxed for 15 hours. The mixture was then cooled and the insolubles were filtered off. The volatiles were distilled off at steam temperature and water vacuum, and the residual oil was fractionated in vacuo to give 2-[3-(1-piperidyl) propoxy]benzaldehyde, b$_{0.1}$ 143° C., $n_D^{25}$=1.5401.

19.5 grams (0.1 mol) of 1-methyl-3-(2,6,6-trimethyl-1-cyclohexen-1-yl)propylamine and 24.7 grams (0.1 mol) of 2-[3-(1-piperidyl)propoxy]benzaldehyde were reacted according to the procedure described in the second paragraph of Example 3 to produce N-[1-methyl-3-(2,6,6-trimethyl-1-cyclohexen-1-yl)propyl]-2-[3-(1 - piperidyl)-propoxy]benzylamine, b$_{0.07}$ 195–205° C., $n_D^{25}$=1.5198.

An aliquot, when treated with an acetone solution of oxalic acid, gave the crystalline dioxalate hemihydrate, M. P. 82–84° C. (recrystallized from ethanol-ether).

*Example 28*

47 grams (0.31 mol) of m-hydroxybenzaldehyde and 56 grams (0.29 mol) of 3-piperidylpropyl chloride were reacted according to the method described in the first paragraph of Example 27 to produce 3-[3-(1-piperidyl)-propoxy]benzaldehyde, b$_{0.08}$ 142° C., $n_D^{25}$=1.5383.

19.5 grams (0.1 mol) of 1-methyl-3-(2,6,6-trimethyl-1-cyclohexen-1-yl)propylamine and 24.7 grams (0.1 mol) of 3-[3-(1-piperidyl)propoxy]benzaldehyde were reacted in the manner described in the second paragraph of Example 3 to obtain N-[1-methyl-3-(2,6,6-trimethyl-1-cyclohexen - 1 - yl)propyl] - 3 - [3-(1-piperidyl)propoxy]benzylamine, b$_{0.07}$ 195–205° C., $n_D^{28}$=1.5178.

An aliquot, when treated with an acetone solution of oxalic acid, gave the crystalline dioxalate hemihydrate, M. P. 182–183° C. with decomposition (recrystallized from 95% ethanol).

*Example 29*

20.6 grams (0.17 mol) of p-hydroxybenzaldehyde were reacted with 25 grams (0.17 mol) of β-piperidylethyl chloride according to the procedure described in the first paragraph of Example 27 to obtain 4-[2-(1-piperidyl)-ethoxy]benzaldehyde, b$_{0.09}$ 150° C., $n_D^{26}$=1.5579. The latter when reacted according to the procedure set out in the second paragraph of Example 3 with 22 grams (0.11 mol) of 2-methyl-4-(2,6,6-trimethyl-1-cyclohexen-1-yl)-butylamine produced N-[2-methyl-4-(2,6,6-trimethyl-1-cyclohexen - 1 - yl)butyl]-4-[2-(1-piperidyl)ethoxy]benzylamine, b$_{0.1}$ 225–240° C., $n_D^{27}$=1.5238.

An aliquot, when treated with an acetone solution of oxalic acid, gave the crystalline dioxalate, M. P. 198–199° C. with decomposition (recrystallized from methanol).

The following compounds may be synthesized according to the procedure described in Example 3:

N-[1-methyl-3-(2,6,6-trimethyl-1-cyclohexen-1-yl)-propyl]-4-[2-(1-piperidyl)ethoxy]benzylamine
N-[2-methyl-4-(2,6,6 - trimethyl-1-cyclohexen-1-yl)butyl]-2-[3-(1-piperidyl)propoxy]benzylamine
N-[2-methyl-4-(2,6,6 - trimethyl-1-cyclohexen-1-yl)butyl]-3-[3-(1-piperidyl)propoxy]benzylamine
N-[1-methyl-3-(2,6,6-trimethyl-1-cyclohexen-1-yl)-propyl]-4-[3-(1-pyrrolidyl)propoxy]benzylamine
N-[2-methyl-4-(2,6,6 - trimethyl-1-cyclohexen-1-yl)butyl]-4-[3-(1-pyrrolidyl)propoxy]benzylamine The following compounds may be synthesized according to the procedure described in Example 4:

N-methyl-N-[1-methyl-3-(2,6,6-trimethyl-1-cyclohexen-1-yl)-propyl]-4-[2-(1-piperidyl)ethoxy]benzylamine
N-methyl-N-[1-methyl-3-(2,6,6-trimethyl-1-cyclohexen-1-yl)-propyl]-2-[3-(1-piperidyl)propoxy]benzylamine
N-methyl-N-[1-methyl-3-(2,6,6-trimethyl-1-cyclohexen-1-yl)-propyl]-3-[3-(1-piperidyl)propoxy]benzylamine
N-methyl-N-[2-methyl-4-(2,6,6-trimethyl-1-cyclohexen-1-yl)butyl]-4-[2-(1-piperidyl)ethoxy]benzylamine
N-methyl-N-[2-methyl-4-(2,6,6-trimethyl-1-cyclohexen-1-yl)-butyl]-2-[3-(1-piperidyl)propoxy]benzylamine
N-methyl-N-[2-methyl-4-(2,6,6-trimethyl-1-cyclohexen-1-yl)-butyl]-3-[3-(1-piperidyl)propoxy]benzylamine
N-methyl-N-[1-methyl-3-(2,6,6-trimethyl-1-cyclohexen-1-yl)-propyl]-4-[3-(1-pyrrolidyl)propoxy]benzylamine
N-methyl-N-[2-methyl-4-(2,6,6-trimethyl-1-cyclohexen-1-yl)-butyl]-4-[3-(1-pyrrolidyl)propoxy]benzylamine

We claim:

1. A compound selected from the group having the formula

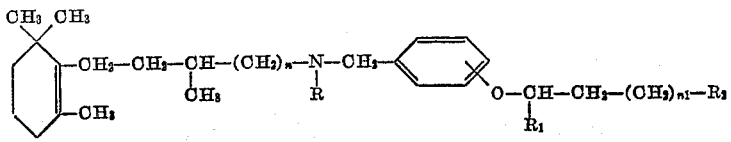

wherein

R and R₁ are members of the group consisting of hydrogen and lower alkyl,

R₂ is a member of the group consisting of the radicals diloweralkylamino, piperidino, morpholino and pyrrolidino, and n and n₁ are members of the group consisting of 0 and 1, and salts thereof.

2. A compound having the formula

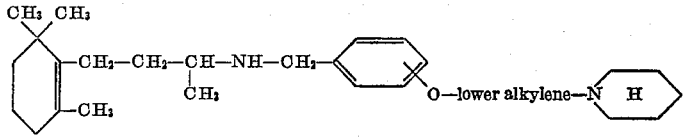

3. A compound having the formula

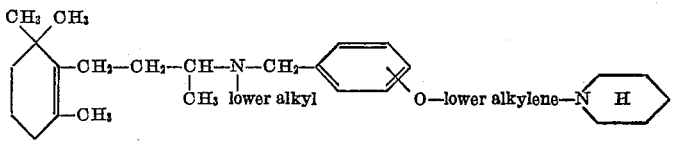

4. A compound having the formula

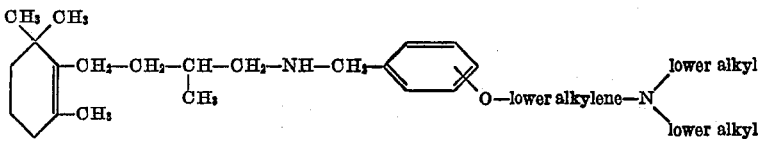

5. N - [1 - methyl-3-(2,6,6-trimethyl-1-cyclohexen-1-yl)propyl]-4-[3-(1 - piperidyl)propoxy]benzylamine dioxalate.

6. N - methyl - N - [1 - methyl - 3 - (2,6,6 - trimethyl-1 - cyclohexen - 1 - yl)propyl] - 4 - [3 - (1 - piperidyl)-propoxy]benzylamine dioxalate.

No references cited.